United States Patent [19]

Yamanaga et al.

[11] Patent Number: 4,581,812
[45] Date of Patent: Apr. 15, 1986

[54] REPLACEABLE HEAD TYPE MULTI-SPINDLE FASTENING APPARATUS

[75] Inventors: Junichi Yamanaga, Fujimi; Masakazu Hironaka, Sakado, both of Japan

[73] Assignee: Honda Giken Kogyo Kabushiki Kaisha, Tokyo, Japan

[21] Appl. No.: 744,178

[22] Filed: Jun. 13, 1985

[30] Foreign Application Priority Data

Jun. 13, 1984 [JP] Japan .................................. 59-119812

[51] Int. Cl.$^4$ ............................................. B21D 39/00
[52] U.S. Cl. ..................................... 29/568; 81/57.22; 81/57.36; 408/53
[58] Field of Search ................... 81/57.5, 57.36, 57.22; 408/53; 29/26 A, 568

[56] References Cited

U.S. PATENT DOCUMENTS 517,260 7/1982 Yamanaga et al. .
4,506,441 3/1985 Yamanaga et al. .
4,542,576 9/1985 Yamanaga ........................... 81/57.36

Primary Examiner—James L. Jones, Jr.
Attorney, Agent, or Firm—Armstrong, Nikaido, Marmelstein & Kubovcik

[57] ABSTRACT

A replaceable head type multi-spindle fastening apparatus wherein each fastening head is provided with plural driven shafts each connected to a respective fastening member at a lower end thereof and to a connecting member at the upper end thereof. Plural nut runners are provided on a connecting head which is movable up and down to connect the runners with the connecting members. Predetermined ones selected from plural driving shafts connected to the nut runners may be engaged to or disengaged from the respective corresponding driven shafts through the respective connecting members.

3 Claims, 6 Drawing Figures

4,581,812

REPLACEABLE HEAD TYPE MULTI-SPINDLE FASTENING APPARATUS

BACKGROUND OF THE INVENTION

This invention relates to a multi-spindle fastening apparatus having a multi-spindle fastening head for effecting simultaneous fastening operations on a workpiece having plural portions to be fastened, and is more particularly directed such a replaceable head apparatus wherein the plural fastening head thereof may be replaced one with another in compliance with changes in the kinds of workpieces.

A known apparatus of this kind is disclosed in Japanese Patent Application Sho No. 57-85029 comprising a supporting column provided on the circumference thereof with an annular rail means, and a plurality of multi-spindle fastening heads supported on the annular rail means. A portion of annular rail means is formed into a movable rail means supported on an elevating frame. An index means is provided on the supporting column so that any desired one of those plural multi-spindle fastening heads may be selected to be positioned on the movable rail means by the index means. The selected fastening head on the movable rail means may be lowered by lowering the elevating frame, to a working station provided on one side of a lower portion of the supporting column for effecting a fastening operation of a workpiece.

It has been usual with this kind of apparatus that plural nut runners are mounted on each of the multi-spindle fastening heads, and that the elevating frame is provided thereon with a connecting head which is connectible to and disconnectible from the fastening head selected on the movable rail means so that the selected fastening head may be connected through the connecting head to a power source such as a nut runner driving air source or the like. This arrangement, however, has various disadvantages described below.

(i) Because of the fact that plural nut runners are mounted on each of the fastening heads, each head is increased in cost as well as in weight. As a result of this increase in weight, the index means is required to be a high output large-sized one which results in an increase in installation cost.

(ii) From a viewpoint of restriction as to space and weight, each nut runner and each fastening member such as a socket or the like on each fastening head must be disposed to be in alignment one with another, and in direct coupling relationship. Accordingly, if an interval between portions to be fastened is smaller than an interval necessary for avoiding mutual interferences of adjacent nut runners, it becomes impossible to effect a fastening operation.

(iii) In a case where a highly accurate fastening torque control is needed, nut runners having a torque transducer operable by a weak electrical current are mounted on the fastening head. In such a case, an electric connector for an external electric power source is required to be provided between the fastening head and the connecting head. However, it often happens that difficulties with such a connector resulting from bad electric contact due to dust, abrasion or the like occur. Accordingly, unreliable torque control results.

OBJECTS AND SUMMARY OF THE INVENTION

This invention has for its object to provide an apparatus in which the foregoing inconveniences are removed by providing the nut runners not on a multi-spindle fastening head but on a connecting head.

Accordingly, this invention is usable in an apparatus of the type that a supporting column is provided on the circumference thereof with an annular rail means, a plurality of multi-spindle fastening heads are supported on the annular rail means, a portion of the annular rail means being formed into a movable rail means supported on an elevating frame and an index means is provided on the supporting column so that any desired one of those multi-spindle fastening heads may be selected to be positioned on the movable rail means by the index means, and additionally the elevating frame is provided thereon with a connecting head which is connectible to and disconnectible from the multi-spindle fastening head selected on the movable rail means. The invention is characterized in that each fastening head is provided with plural driven shafts connected to respective fastening members provided on a lower portion of the fastening head and is additionally provided on an upper surface thereof with respective connecting members connected to the respective driven shafts. Plural nut runners are provided on the connecting head so that, in conjunction with connecting and disconnecting operations of the connecting head in relation to the multi-spindle fastening head selected on the movable rail means, predetermined ones selected from plural driving shafts connected to the nut runners may be brought into engagement with and disengagement from the respective corresponding driven shafts through the respective connecting members on the selected fastening head.

BRIEF DESCRIPTION OF THE DRAWINGS

The above and other objects and the attendant advantages of the present invention will become readily apparent by reference to the following detailed description when considered in conjuntion with the accompanying drawings wherein.

DETAILED DESCRIPTION OF PREFERRED EMBODIMENTS

Figure 1:
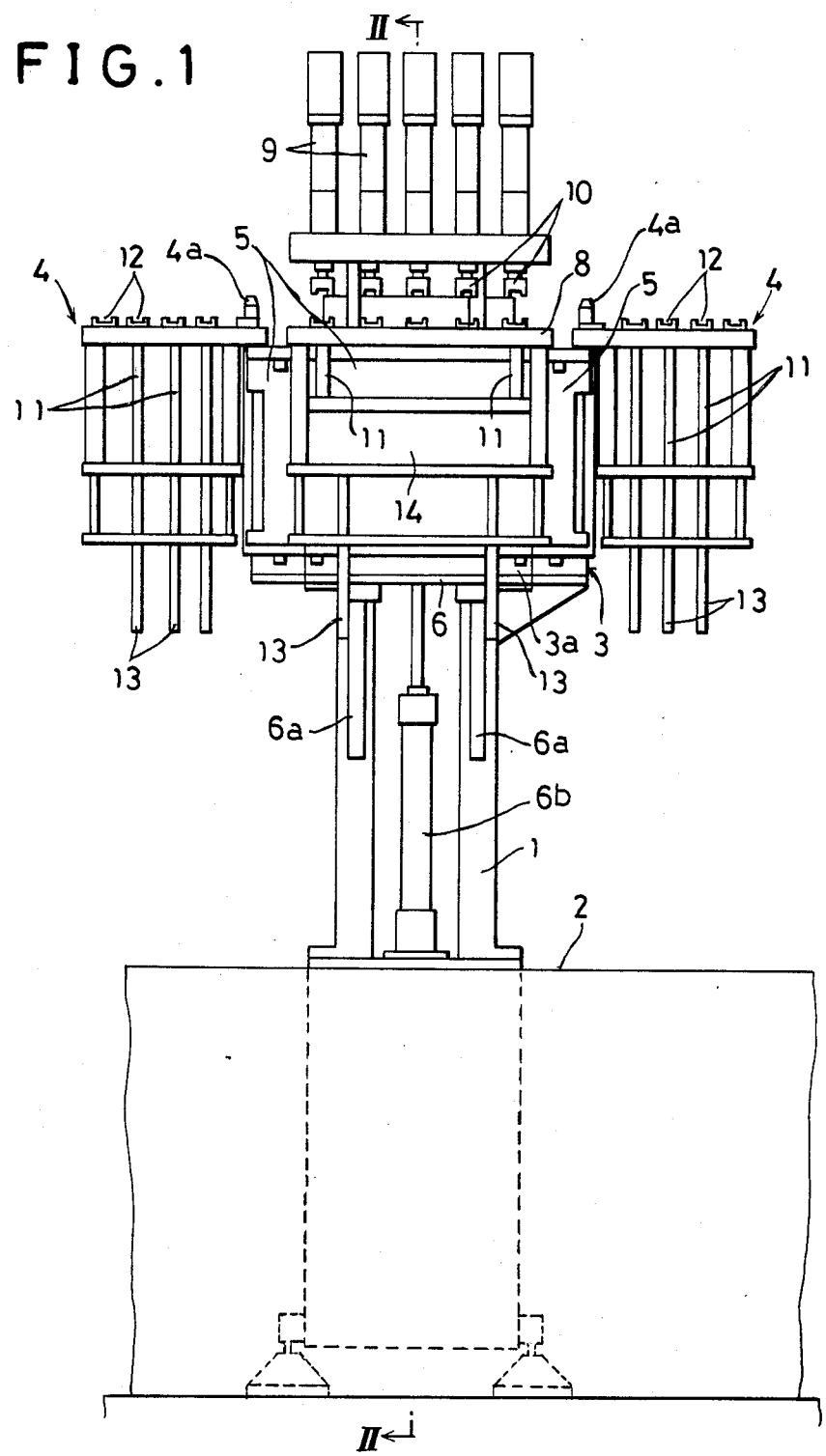
FIG. 1 is a front view of one embodiment of this invention.
Figure 2:
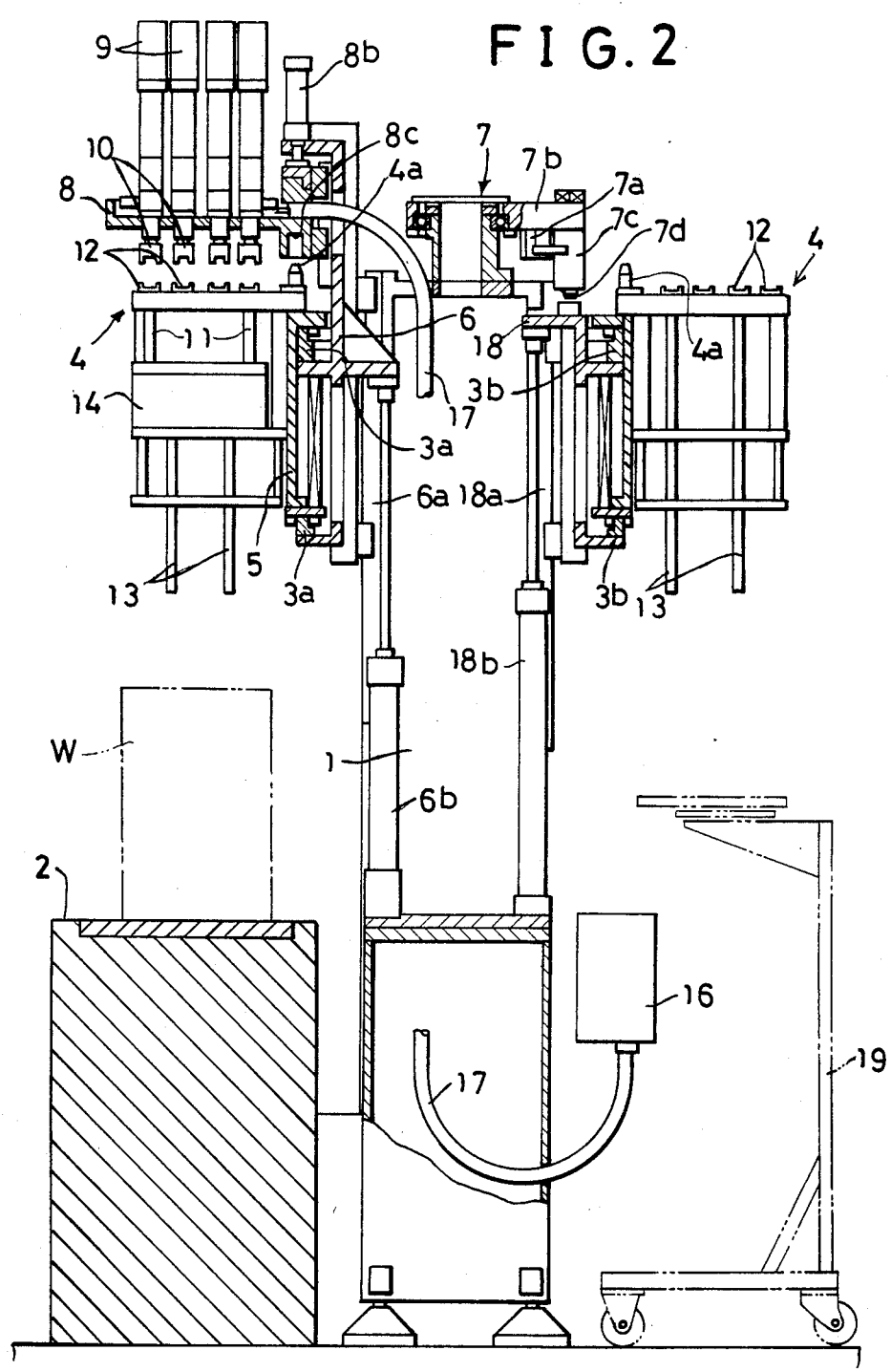
FIG. 2 is a sectional view taken along the line II—II in FIG. 1.
Figure 3:
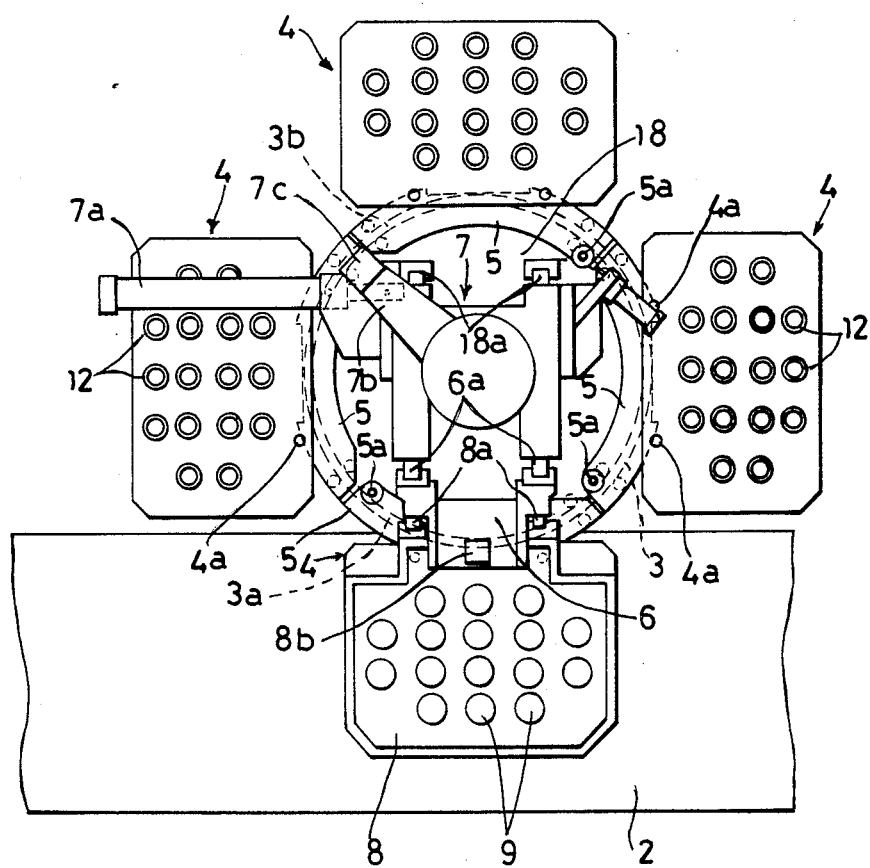
FIG. 3 is a top plan view thereof.

Embodying examples of this invention will now be explained with reference to the accompanying drawings:

Referring to FIGS. 1 and 2, a supporting column 1 is mounted on a jig table 2 which is installed at a working station and located in front of a lower portion of the supporting column 1. A pair of upper and lower annular rails 3,3 constituting an annular means are provided on the circumference of an upper portion of the supporting column 1. As shown in FIG. 2 and FIG. 3, a plurality of multi-spindle fastening heads 4 are supported through respective frame bases 5 on the annular rails 3, 3 and are movable along on the rails 3, 3 in a circumferential direction. Front portions of the annular rails 3, 3 are formed into movable rails 3a, 3a supported on an elevating frame 6 which is provided on the supporting column 1 and is movable upwards and downwards. An index means 7 is provided on an upper portion of the supporting column 1 so that any desired one of those multi-spindle fastening heads 4 may be selected to be positioned on the movable rails 3a, 3a by the index means 7. The selected one may be lowered by lowering the movable rails 3a, 3a onto the foregoing jig table 2 for effecting a fastening operation of a workpiece W.

The index means 7 comprises an index arm 7b which is turnable in regular and reverse directions in a range of 90° by an index cylinder 7a. An engaging pin 7d which is provided on a forward end of the arm 7b through a cylinder 7c and movable upwards and downwards can be brought into engagement with and disengagement from a pin opening 5a made in an upper surface of each of the foregoing base frames 5. In this manner, by turning the arm 7b in regular and reverse directions and engaging and disengaging the engaging pin 7d, any of those frame bases 5 may be moved along on the annular rails 3, 3 by 90° at a time, and thereby the predetermined multi-spindle fastening head 4 corresponding to the kind of the workpiece W may be selected on the movable rails 3a, 3a.

The elevating frame 6 is arranged to be moved upwards and downwards by an elevating cylinder 6b along on a pair of guide rails 6a, 6a provided on a front surface of the supporting column 1. The movable rails 3a, 3a constituting a movable rail means are fixed to a front surface of the elevating frame 6. A connecting head 8 which is connectible to and disconnectible from the fastening head 4 on the movable rails 3a, 3a is provided on an upper portion of the front surface of the elevating frame 6. More in detail, the connecting head 8 is movable upwards and downwards with a comparatively small stroke by a cylinder 8b along on guide rails 8a, 8a provided on the elevating frame 6 so that the head 8, if lowered, may be mounted, at pin opening 8c made in a lower surface thereof, on pins 4a provided on an upper surface of the fastening head 4 positioned on the movable rails 3a, 3a, whereby the same may be set in position at a predetermined connecting position thereof adjacent to the upper surface of the fastening head 4.

According to this invention, each fastening head 4 is provided with plural driven shafts 11 connected to respective fastening members 13 provided on a lower portion of the head 4 and is additionally provided on an upper surface thereof with respective connecting members 12 connected to the respective driven shafts 11. In addition, plural nut runners 9 are provided on the connecting head 8 so that in conjunction with connecting and disconnecting operations of the connecting head 8 in relation to the fastening head 4 on the movable rails 3a, 3a, predetermined one selected from respective driving shafts 10 connected to the respective nut runners 9 may be brought into engagement with and disengagement from respective corresponding driven shafts 11 through the respective connecting members 12 on the fastening head 4.

In the illustrated example, the connecting members 12 are of dog clutch type. The number of connecting members 12 is equal to the number of the driving shafts 10. The connecting members 12 are disposed on an upper surface of each of the fastening heads 4 so as to coincide with the disposed condition of the plural driving shafts 10 projecting downwards on the lower surface of the connecting head 8. Predetermined plural ones, among those connecting members 12, are connected to the driven shafts 11, and the remaining connecting members 12 become dummy ones, that is, ones not connected to any of the driven shafts 11.

Figure 4:
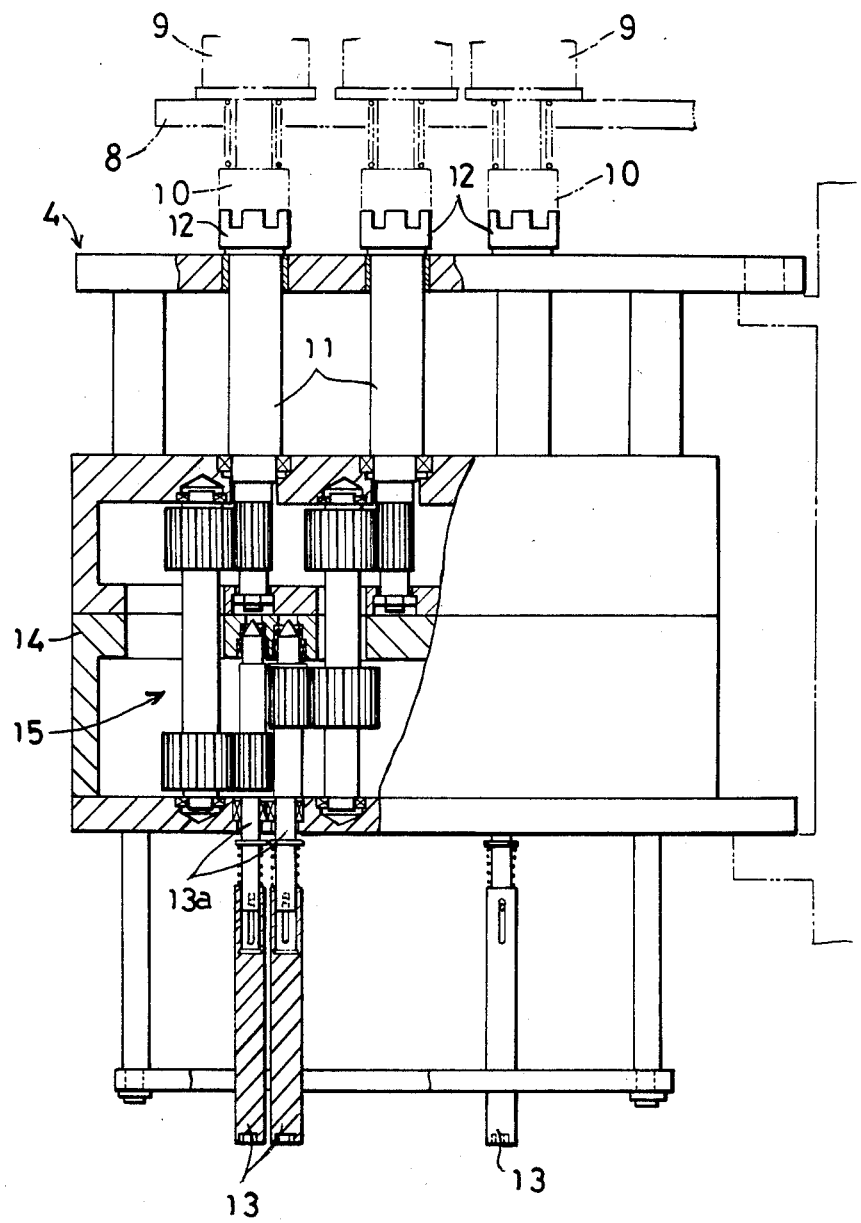
FIG. 4 is a side view, partly in section, of a multi-spindle fastening head with a gear box.

In a case where an interval between portion of the workpiece W to be fastened is narrow and the fastening members 13 corresponding to the portions are required to be so disposed as to be near one to another, the fastening head 4 having a gear box 14 as shown in FIG. 4 is used. An attaching shaft 13a for each fastening member 13 is connected to the corresponding driven shaft 11 through a gear mechanism 15 provided in the gear box 14 so that the space interval between the disposed fastening members 13 may be narrowed.

In a case where a highly accurate fastening torque control is required, the nut runners 9 on the connecting head 8 are formed into ones having a torque transducer, and the transducer is connected through a wiring tube 17 to an external electric power source 16.

In the illustrated example, for the purpose of replacing of any of the multi-spindle fastening heads 4 on the annular rails 3, 3 with a new one, rear side portions of the annular rails 3, 3 are formed into second movable rails 3b, 3b supported on a second elevating frame 18 so that, by elevating and lowering of the second movable rails 3b, 3b, discharging of any desired one of the fastening heads 4 onto a head replacement carrier 19, and charging of a fresh multi-spindle fastening head may be carried out. Guide rails 18a and an elevating cylinder 18b for the elevating frame 18 are provided.

Next, the operation of the apparatus will be explained as follows:

First, the multi-spindle fastening head 4 corresponding to the workpiece W set on the jig table 2 is selected to be positioned on the first movable rails 3a, 3a by the index means 7. Thereafter, the connecting head 8 is lowered to be set in position at the predetermined connecting position. The respective driven shafts 11 on the fastening head 4 are connected, through their respective upper connecting members 12, to the respective driving shafts 10 connected to the predetermined nut runners 9 on the connecting head 8. If the elevating frame 6 is then lowered, the fastening head 4 is lowered together with the connecting head 8, and a bolting operation of the respective portions of the workpiece W to be fastened may be carried out by the respective fastening members 13 connected to the respective driven shafts 11.

Figure 5:
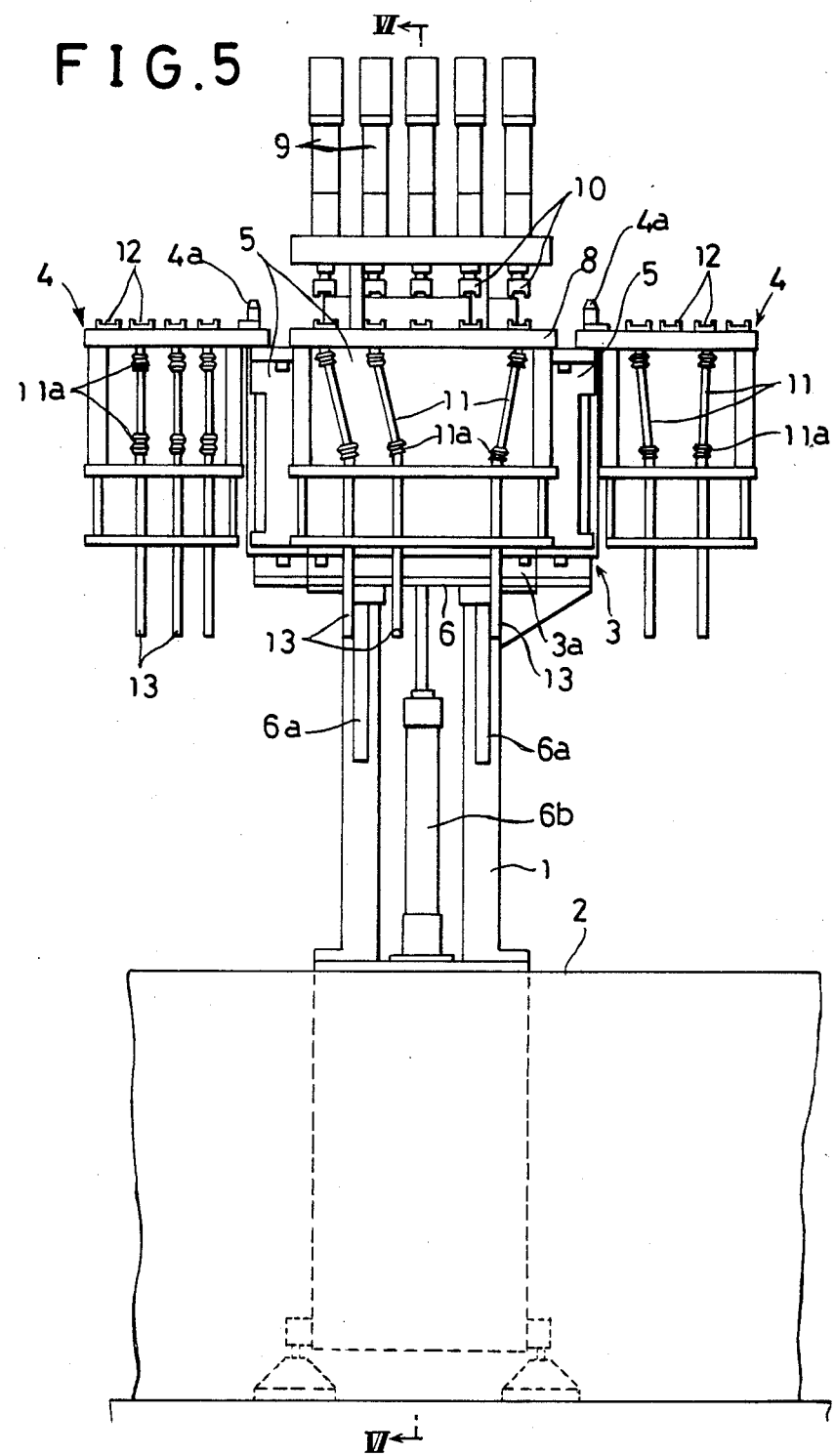
FIG. 5 is a front view of another embodiment of this invention.
Figure 6:
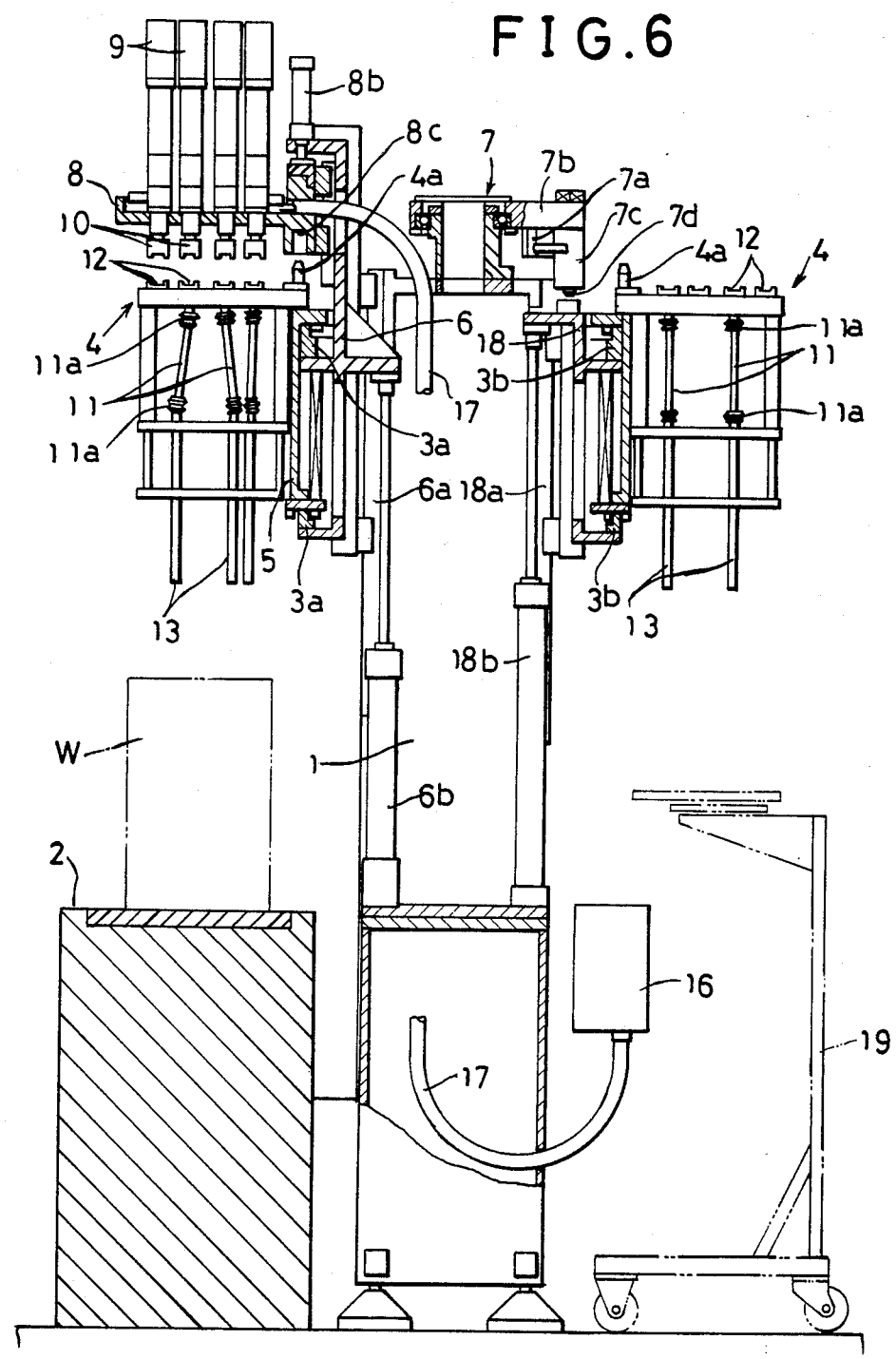
FIG. 6 is a sectional view taken along the line VI—VI in FIG. 5.

In the foregoing embodying examples, each fastening head 4 is provided with the driven shafts 11 directly connected to the connecting members 12 on the upper surface thereof, and the fastening members 13 are connected to the respective driven shafts 11 directly or through the gear mechanisms 15 such as the gear box 14. However, a modification can be considered, as shown if FIG. 5 and 6, wherein each driven shaft 11 is formed into one which has on its upper and lower ends respective constant velocity universal joints 11a, 11a so that the same may be connected to each connecting member 12 and each fastening member 13 through the respective joints 11a, 11a. This modification is advantageous in that the fastening members 13 can be disposed at any desired position without being restricted by the positions of the disposed connecting members 12. Additionally, each fastening head 4 can be made as light in weight as possible avoiding a large weight represented by a gear box 14 or the like mounted thereon. Consequently the head 4 can be decreased in weight by that amount.

Thus, according to this invention, the nut runners are disposed on the connecting head so that in comparison with a conventional example wherein the nut runners are mounted on each of the fastening heads, each fastening head can be decreased, in size, weight and cost. An inertia force caused when those fastening heads are moved along on the annular rails can be reduced, and the index means can be small-sized. The installation cost for a whole apparatus can be largely decreased. Additionally, owing to the fact that the nut runners are removed from each fastening head, the fastening head can afford room for space to be used and for weight to be burdened, and thus it makes it possible that, by mounting a gear box or a driven shaft with universal joints or the like on the fastening head, an interval between fastening members is narrowed in compliance with an interval between portions to be fastened which can now be smaller than the interval between nut runners. In addition, if the nut runners have a torque transducer, it is possible to make an electric connection thereof directly with an external electric power source at a position on the connecting head. Consequently, it becomes unnecessary to make an electric connection through a connector between each fastening head and a connecting head as in the convention example. Accordingly, there can be eliminated unreliable torque control resulting from a bad contact of the connector. Highly accurate torque control can be carried out and thus the foregoing inconveniences in the conventional example can be surely removed.

It is readily apparent that the above-described replaceable head type multi-spindle fastening apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A replaceable head type multi-spindle fastening apparatus including a supporting column provided on the circumference thereof with an annular rails means, a plurality of multi-spindle fastening heads supported on the annular rail means, a portion of the annular rail means being formed into a movable rail means supported on an elevating frame, an index means provided on the supporting column so that any desired one of those multi-spindle fastening heads may be selected to be positioned on the movable rail means by the index means, and a connecting head provided on the elevating frame which is connectible to and disconnectible from the multi-spindle fastening head selected on the movable rail means, characterized in that each fastening head is provided with plural drive shafts connected to respective fastening members provided on a lower portion of the fastening head and is additionally provided on an upper surface thereof with respective connecting members connected to the respective driven shafts; and plural nut runners are provided on the connecting head so that, in conjunction with connecting and disconnecting operations of the connecting head in relation to the multi-spindle fastening head selected on the movable rail means, predetermined ones selected from plural driving shafts connected to the nut runners may be brought into engagement with and disengagement from the respective corresponding driven shafts through the respective connecting members on the selected fastening head.

2. A replaceable head type multi-spindle fastening apparatus as claimed in claim 1, wherein at least one of the fastening heads is provided with a gear box mounted thereon, and the respective driven shafts and the respective fastening members are interconnected through respective gear mechanisms housed in the gear-box.

3. A replaceable head type multi-spindle fastening apparatus as claimed in claim 1, wherein each driven shaft has on its upper and lower ends respective universal joints, and the same is connected to the corresponding connecting member and the corresponding fastening member through the respective universal joints.

* * * * *